US008115665B2

(12) United States Patent
Zahavi

(10) Patent No.: US 8,115,665 B2
(45) Date of Patent: Feb. 14, 2012

(54) METHOD AND SYSTEM FOR EXTENDING OPERATIONAL ELECTRONIC RANGE OF A VEHICLE

(75) Inventor: Dov Zahavi, Haifa (IL)

(73) Assignee: Elbit Systems Ltd., Rehovot (IL)

( * ) Notice: Subject to any disclaimer, the term of this patent is extended or adjusted under 35 U.S.C. 154(b) by 443 days.

(21) Appl. No.: 12/438,631

(22) PCT Filed: Jul. 29, 2007

(86) PCT No.: PCT/IL2007/000944
§ 371 (c)(1),
(2), (4) Date: Feb. 24, 2009

(87) PCT Pub. No.: WO2008/029384
PCT Pub. Date: Mar. 13, 2008

(65) Prior Publication Data
US 2009/0251354 A1   Oct. 8, 2009

(30) Foreign Application Priority Data
Sep. 7, 2006   (IL) .......................................... 177948

(51) Int. Cl.
*G01S 7/38* (2006.01)
(52) U.S. Cl. ................. 342/13; 342/14; 342/15; 342/59
(58) Field of Classification Search .............. 342/13–15, 342/59
See application file for complete search history.

(56) References Cited

U.S. PATENT DOCUMENTS

| 3,980,259 | A | 9/1976 | Greenhalgh et al. |
| 6,422,506 | B1 * | 7/2002 | Colby .......................... 244/1 TD |
| H002254 | H * | 6/2011 | Hebert et al. .................. 114/259 |
| 2004/0030451 | A1 * | 2/2004 | Solomon ........................ 700/245 |
| 2004/0068416 | A1 * | 4/2004 | Solomon ........................... 705/1 |
| 2005/0017129 | A1 * | 1/2005 | McDonnell ............... 244/110 G |
| 2005/0230535 | A1 | 10/2005 | Ruszkowski |
| 2006/0074557 | A1 * | 4/2006 | Mulligan et al. .............. 701/213 |
| 2006/0167597 | A1 | 7/2006 | Bodin et al. |
| 2007/0108345 | A1 * | 5/2007 | McDonnell ............... 244/110 C |
| 2009/0212157 | A1 * | 8/2009 | Arlton et al. .................... 244/63 |
| 2009/0251354 | A1 * | 10/2009 | Zahavi ............................ 342/20 |

FOREIGN PATENT DOCUMENTS

| EP | 1602576 A2 | 12/2005 |
| WO | WO 00/00842 | 1/2000 |
| WO | WO 01/07318 | 2/2001 |
| WO | WO 2005/123502 | 12/2005 |
| WO | WO 2008029384 A1 * | 3/2008 |

(Continued)

OTHER PUBLICATIONS

L-3 Communications Demonstrates Compliant Interoperability of Next Generation Airborne, Shipboard, and Surface CDL Systems, Business Wire. New York:Jul. 26, 2006. p. 1-2.*

(Continued)

*Primary Examiner* — John Sotomayor
(74) *Attorney, Agent, or Firm* — Sughrue Mion, PLLC

(57) ABSTRACT

A method and system for extending the electronic operational range of a slow vehicle, such as a ship, by using a remotely controlled unmanned faster vehicle, such as an Unmanned Aerial Vehicle (UAV), and by way of example a remotely controlled drone. More particularly, the present invention relates to a method and system for extending the Electronic Warfare (EW) support for a ship.

24 Claims, 3 Drawing Sheets

FOREIGN PATENT DOCUMENTS

WO    WO 2009138983 A2 * 11/2009

OTHER PUBLICATIONS

Spawar Gives Cubic Final Acceptance for Navy Communications Data Link System (CDLS) Business Wire. New York:Jul. 19, 2006. p. 1-2.*

Spezio, Anthony E., "Electronic Warfare Systems", IEEE Transactions on microwave theory and techniques, IEEE Service Center, Piscataway, NJ, US, vol. 50, No. 3, Mar. 2002, XP011038670 ISSN: 0018-9480.

International Search Report for International Application No. PCT/IL2007/000944 mailed Dec. 13, 2007.

* cited by examiner

METHOD AND SYSTEM FOR EXTENDING OPERATIONAL ELECTRONIC RANGE OF A VEHICLE

CROSS-REFERENCE TO RELATED APPLICATIONS

This application is a National Phase Application of PCT International Application No. PCT/IL2007/000944, International Filing Date Jul. 29, 2007, claiming priority of Israel Patent Application 177948, filed Sep. 7, 2006, both of which are incorporated herein by reference in their entirety.

FIELD OF THE INVENTION

The present invention relates generally to telecommunications and in particular to a method and system for telecommunications in electronic warfare.

BACKGROUND OF THE INVENTION

Slow vehicles, such as a ship, are typically easy to detect due to their large signature, slow speed and limited maneuverability—all are causes making them easy to hunt, for example, from the air. Ships are also limited in their Line Of Sight (LOS) dependent warning means, such as RADAR or Electronic Intelligence (Elint) Measures to the horizon range (typically few tens of kilometers). Thus, an early alert is hard to achieve. It is therefore desirable to enhance the capabilities of a ship to avoid being located by a remote sensor, and to extend the range of early alert by extending the range of its detection means. This remote sensor may typically be associated with emission of electromagnetic radiation, e.g., from the sensor itself or from the vehicle on which it is mounted, and therefore may be regarded as an emitter.

Typically a ship would have a set of receivers whose antennas would be mounted as close as possible to the tip of its mast (so as to extend the line of sight). These receivers would be searching the frequency ranges of radiation from the known emitters and gauge their directions and ranges. Typically, in hostile situations a ship would be reluctant to activate its radar and thus announce its presence. As soon as an emitter is detected, the ship would activate countermeasure, such as shooting a chaff rocket to explode a certain distance between the emitter and the ship. The chaff would bloom and stay for a period of time and would act as a decoy, luring the emitter away from the ship, which could then maneuver away under some screening countermeasures. Alternatively, the ship could similarly shoot an active decoy rocket. At the same time the ship could also employ its on-board active countermeasures to transmit signals to confuse or jam the sensor.

The actual parameters of these countermeasures are very complex and may depend on the ship movements, the wind conditions, the sensor technology, the sensor location and direction and many other parameters. A wrong decision may not only decrease the effectiveness of the protection but actually assist the hostile sensor in homing onto the ship. Decisions regarding the activation of countermeasures must be taken, implemented and deployed in the very short time between the alarm being given and the actual hit.

Limitations for extending the period of time available for the management of countermeasures include the short range of the horizon (LOS), the difficulty in quick assessment of the actual location of the emitter and the very short time for proper deployment of the countermeasures. It is therefore advantageous to provide system and method for extending the actual LOS of the countermeasure systems of a ship and to improve the ability of a ship to identify the location of an emitter while remaining at a safe distance.

SUMMARY OF THE INVENTION

The present invention discloses a system, device and method for improving the capabilities of a ship to avoid, evade, or escape an attack by a remotely launched faster object, which object may emit electromagnetic radiation, e.g., an emitter. There is also disclosed a system, device and method for extending the electronic horizon of a ship, including a long range, long endurance, Unmanned Aerial Vehicle (UAV) designed and operated according to embodiments of the present invention. The UAV may be controlled and operated from the protected ship. The UAV may further be adapted to perform most or all of its tasks in a partially or fully autonomous mode so as to continue servicing even when operational communication with its ship is deteriorated or completely disconnected. The UAV may be equipped with enough energy source such as fuel, with electronic systems providing passive and/or active electronic warfare (EW) capabilities, including sensor decoy and deception and with search and acquire capabilities, to serve as an electronic extension of the on-board sensors of the ship. The UAV may further be equipped with navigation and location systems, as well as with communication systems for supporting accomplishing its main goals.

BRIEF DESCRIPTION OF THE FIGURES

The present invention will be understood and appreciated more fully from the following detailed description taken in conjunction with the figures in which.

Figure 1:
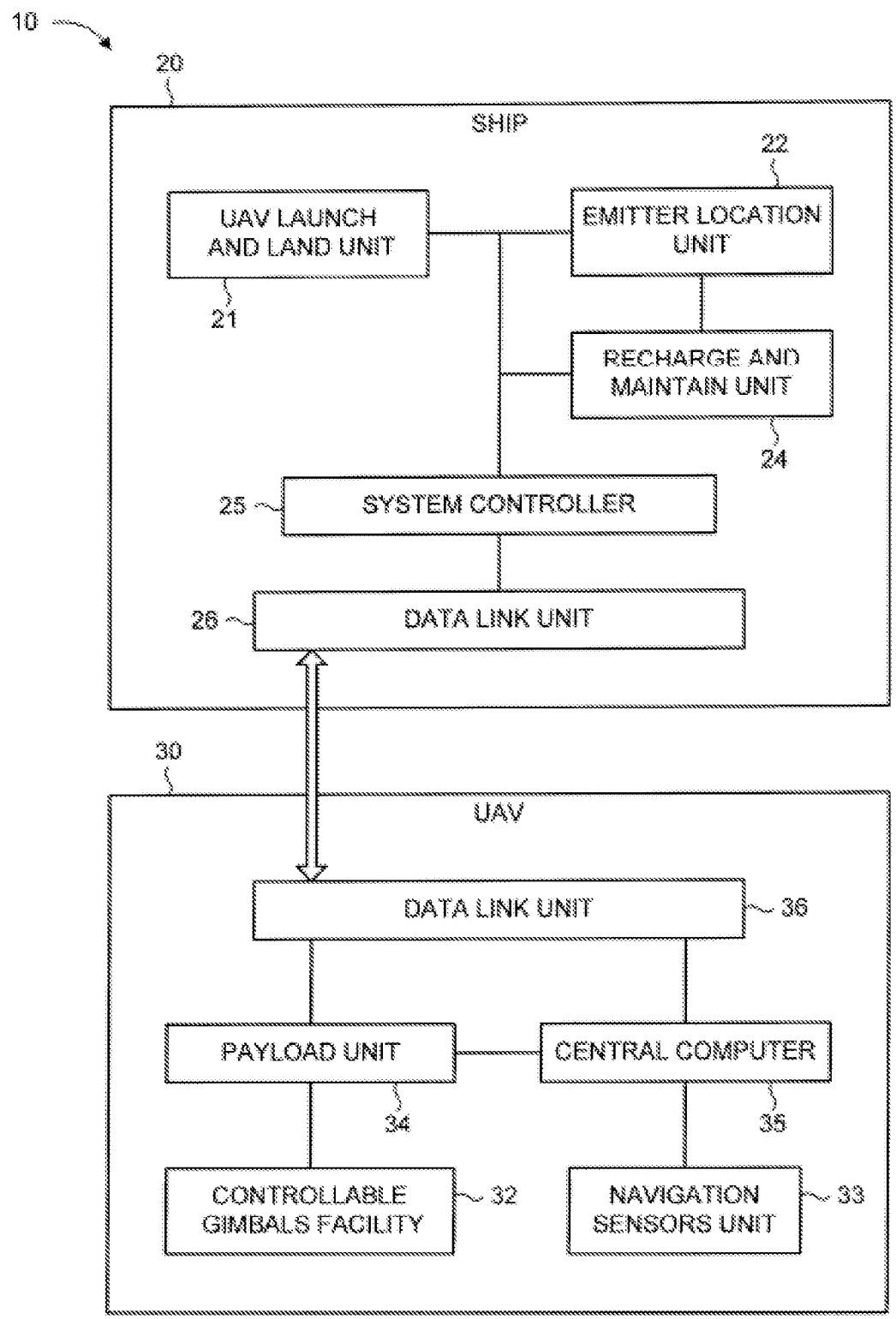
FIG. 1 is a schematic block diagram of a system designed, built and operable according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Reference is made to FIG. 1, which is a schematic block diagram of system 10 according to embodiments of the present invention. System 10 may comprise two main subsystems 20 and 30 associated respectively with a ship and a UAV.

Subsystem (ship) 20 may comprise UAV launch and land unit 21, an emitter location unit 22 interfacing to the ship EW suite, a System Controller unit 25, interfacing with the ship navigation system and the ship C4I system and recharge and maintain unit 24, and a data link unit 26. System controller 25 may be adapted to collect data from all connected units and to control system 10 when the control is made from the ship. Launch and land unit 21, emitter location (EL) unit 22, and data link unit 26 may be in active connection with system controller 25. Launch and land unit 21 may comprise all required facilities to support launching and landing the UAV from and back to ship 20. Emitter location unit 22 may comprise processing means in active communication with data relating to nature and location of emitters referring to the ship. Data relating to these emitters may be received from any available source, for example, from receivers and processing means of the ship and specifically from the ship's electronic warfare (EW) suite, and from data received and/or processed by the UAV. One of the roles of emitter location unit 22 may be identification of emitter position and invoking a suitable indication.

Recharge and maintain unit 24 may provide for required support for the operating of the UAV prior to its launching and after its return from a mission. These may comprise fueling or charging of batteries, programming of operational parameters, testing and—if necessary—replacement or repair of UAV sub-systems and preparing the UAV for launch.

System controller 25 may comprise computation and memory resources for supporting calculation of ship and UAV location and synchronization of same; emitter behavior scenario identification capability to identify evolving emitter behavior scenario, to allocate an emitter to a UAV and to select pull-away maneuvers; UAV replace capability to attend to a situation when replacement of a UAV is required, to establish and display to an operator the system status, the UAV status and emitters status; to receive instructions, for example, from an operator, to accept and to carry out such instructions; to record predefined events during operation of the system and make them available for notification or viewing concurrently, or store them and make them available for debriefing of the operations at a later time, for maintenance and for training. System controller 25 may have access to any available source of information on board, such as, for example, Ship Navigation Bus, etc.

Emitter location (EL) unit 22 may comprise processing means adapted to correlate data residing in the UAV with the EW suit of the ship, to compute location of detected emitting sources including those identified as relevant to the ship and to produce warning of the position of an emitter passing into a defined boundary. Emitter location (EL) unit 22 may comprise of a fast processor and software, an interface to the ship EW suite and an interface with system controller 25.

Launch and land unit 21 may comprise facilities required for supporting pre-launch operations (such as pre-flight testing, battery charging, and the like), launch operations (such as loading updates, catapulting, and the like), landing operations, and after-flight operations.

In operation, system 10 may operate according to several operational modes. According to one operational mode in accordance with embodiments of the present invention, system 10 may be adapted to provide EW protection to ship 20. In this mode UAV 30 may be operated to maintain a peripheral electronic screen around ship 20 in order to reduce, eliminate, minimize, or prevent emitters from relying on the ship's electronic signature and/or electronic control in order to target ship 20. In this operational mode UAV 30 may be operated at a relatively low altitude above sea level. Once an emitter is identified, for example, by the surveillance systems on board of ship 20 or by those carried by UAV 30, an appropriate scenario of emitter's behavior is calculated and UAV 30 may execute active measures in response to the emitter's behavior such as recording the emitter signals, and retransmitting them amplified and modulated to simulate Radar echoes coming from a ship.

In another operational mode, system 10 may be operated to emulate a tall mast for the ship by operating UAV 30 at higher level, typically 3000 feet or higher, near ship 20, thus virtually extending the surveillance-carrying mast to the height of flight of UAV 30 and respectively extending the electronic horizon of ship 20. While operating in this mode, the EW receivers carried by UAV 30 may receive and detect emissions of suspected emitters and report them to system controller 25. In this mode, electronic countermeasures (ECM) of UAV 30 may be selectively deactivated, or in some embodiments, selectively removable from UAV 30 in order to extend its free payload for other missions. Information collected by the receivers of system 10 regarding location of relevant emitters may be extracted by any method. According to some embodiments, multiple readings of the energy received by the emitter may be collected from different locations of UAV 30 and/or ship 20 by a directional receiver, and then the location of the emitter may be calculated based on plurality of readings from such receiver.

In yet another operational mode, system 10 may operate plurality of UAVs 30, emulating multiple tall masts located in different locations. This operational mode may be beneficial, for example, by permitting calculation of the location of an emitter, or energy signature indicating an emitter, may be carried out in a shorter period of time and preferably with higher accuracy. In some embodiments, UAVs 30 may transmit to ship 20 data regarding the energy signature received from a suspicious emitter, and ship 20 may receive data from the plurality of UAVs 30 and perform the calculation of the precise location, e.g., distance and direction, velocity, acceleration, direction of travel, etc., of the emitter.

UAV 30 may be any kind of unmanned air vehicle, for example, an electrically powered, fully autonomous platform. UAV 30 may comprise a central computer 35, a controllable gimbals facility 32, a navigation sensors unit 33 a payload unit 34 and data link unit 36.

In operation, central computer 35 may control UAV 30 while in flight and during preflight and after flight periods as may be desired. As part of this structure, central computer 35 may control substantially all or most of the subsystems of UAV 30, for example, a controllable gimbals facility 32 to keep the orientation of antennas of UAV 30 in a desired position regardless of the UAV 30 maneuvers, a navigation sensors unit 33, a payload unit 34 and data link unit 36. UAV 30 may be fully autonomous in flight. UAV 30 may receive signals from its associated ship 20. These signals may include information regarding the location of ship 20 and commands relating to the operations to be taken by UAV 30, such as what flight pattern should be followed, what is the current mode of operation, what emitter signatures to seek, etc. Central computer 35 may be adapted to continuously track the location of ship 20 and of UAV 30, and using this data, to calculate accordingly the next-to-be-performed flight pattern, including compensating for drifts due to wind, etc.

Payload unit 34 may be adapted to carry, operate, and launch any kind of operational warfare measures carried by UAV 30. For example, payload unit 34 may be built to provide for a replaceable, add-on warfare measures, which may be installed on UAV 30 or removed to allow for installation of a different warfare measures. Payload unit 34 may be adapted to various tasks. For example, when used for EW operation, payload unit 34 may comprise at least one set of transmit and receive antennas, a wide band receiver, an RF memory module, an ECM technique generator, and a power amplifier. In this configuration, payload unit 34 may be adapted to cover a range of 360 degrees in the horizontal plane and at least a range of 30 degrees in the elevation plane. The elevation operational range is adapted to compensate also for spatial maneuvers of UAV 30. UAV 30 may be adapted to automatically or semi-automatically receive incoming RF signals, identify them, associate them with type and location of the transmitter, store in memory the analyzed information, and report it to ship 20.

Data link unit 36 in UAV 30 and data link unit 26 in ship 20 may be constructed and adapted to support all communications between ship 20 and UAV 30. Communication between data link unit 26 and data link unit 36 may be used to convey, for example, information regarding status of UAV 30 and payload unit 34, information containing control commands from ship 20 to UAV 30, and particularly, to payload unit 34, information supporting Take Off and Landing (TOL) processes.

Payload unit 34 may be adapted to handle various missions. One such mission may be transmissions of electronic countermeasures (ECM). Any available technique for electronic transmission which may be incorporated into payload 34 and that may stand the weight limitations deducted from UAV 30 operational limitations; may be used. Payload 34, when performing countermeasures of electronic transmissions, may comprise electronic surveillance measures (ESM), ECM and Radar Warning Receiver (RWR). In ECM mode, operation payload 34 may provide, additionally to the ECM capabilities, also long-range analysis of the electronic order of battle (EOB) of the scene around ship 20. In some embodiments of the invention, in ECM mode of operation payload 34 may provide high probability of intercept (POI) of a detected emitter, e.g., up to 100%; handling of all relevant emitter types; precise measurement of parameters such as frequencies, pulse modulations etc. of the emitter. Payload 34 may provide for operation in a dense electromagnetic (EM) environment and serve advanced combat scenarios such as serving a number of simultaneous emitters, handling highly maneuvering emitters, dealing with complex waveforms emitters, etc.; automatic signal analysis, acquisition and emitter identification; coherent and non-coherent techniques generation for deception and/or disruption of an emitter; directional technique transmission; integration capability with the on-board ESM of ship 20; automatic and/or remotely controlled ECM activation and ECM program selection.

In embodiments of the invention, in ECM operational mode, payload 34 may provide fast and efficient off-board deception and disruption of hostile sensors for self defense; high POI over the horizon of ship 20, reception and identification of emitters at long distances in order to enhance the situation awareness picture and to provide range and direction of the emitter; measurement of coarse direction of arrival (DOA) and data collection for precise DOA and location measurement, for EOB orientation and targeting purposes. In some embodiments of the system according to the present invention, location measurement may be performed by utilizing DOA calculation from more than one UAV 30. In some embodiments of the invention, detection of radar signals may be carried out by utilizing instantaneous direction finding (DF) and digital receiving techniques. Received RADAR pulses may be converted into pulse descriptors (PDW) which may be used for signal interception and analysis on board UAV 30; forwarding of received signals converted into PDW to ship 20 for further processing; computation of further accurate DOA on board of ship 20 by considering of PDW received from more than one UAV 30 by using Time of Arrival (TOA) algorithm. By identifying and locating all of the currently existing emitters, close and remote from ship 20, UAV 30 may be adapted to interface with EW system of ship 20 for enhancement and fusion of EOB information.

In ECM operational mode, interception, analysis and identification of RADAR signals by UAV 30 may be carried out with very high probability of intercept. Payload 34 may provide emitter identification, for example, in accordance with UAV 30 on-board library of emitters, for example, stored in on-board memory. This information may be used for EOB awareness when it is forwarded to ship 20 and further fused with such information received from additional UAVs 30; ECM program allocation and selection of ECM techniques in payload 34; and setting on signal tracking units in payload 34.

In ECM mode of operation, payload 34 may measure DOA of received RADAR signals. This information may be used, for example, for signal analysis and tracking support, for providing information for the EOB picture, for decisions of ECM response, for directing the ECM response, and the like. Information extracted during this analysis may, for example, be used for providing warning or an emitter for adapting ECM policy against a detected emitter in accordance with a pre-programmed emitter scenario library. In this arrangement, payload 34 may respond to an emitter immediately and autonomously without waiting for the Central Controller or human operator instructions. In some embodiments of the invention, this information may further be used for selection of appropriate electronic counter measures in accordance with a pre-programmed library of ECM scenarios. Payload 34 may then respond, when enabled, autonomously to a detected emitter, or abort response if an emitter has been identified as non-hostile. In case of non continuous signals, several signals may use the transmitter with per-pulse transmission steering switching.

In some embodiments of the invention, payload 34, when acting in ECM mode, may include a panoramic reception array of antennas with substantially 360 degrees of azimuth coverage and ±30 degrees in elevation; a channelized receiver for measurement of angle of arrival (AOA) of received RADAR signal, frequency of said signal, time of arrival (TOA), pulse width (PW), inter-pulse phase and frequency coding and of amplitude, etc.; an acquisition and signal tracking hardware which may handle signal storing and tracking; an omni directional reception antenna; a digital radio frequency memory (DRFM) based response channel adapted to digitize a received signal, store it in RF digital memory, reconstruct it, and perform signal manipulation and apply techniques in accordance with control signal from the technique generator; a fast switching transmitter capable of pre-pulse switching of signal to an antenna; and a computing unit adapted to analyze data, identify emitters and manage EW techniques and communication autonomously or in conjunction with the ship.

UAV 30 may be built of suitable materials, such as composite materials, and equipped with suitable thrust means, for example, it may be electrically powered. UAV 30 may be designed and built to operate either fully autonomously or in conjunction with ship 20. UAV 30 may be adapted to be capable to be launched from and land on ship 20. UAV 30 may be capable of staying long periods in air, for example over 4 hours, and may operate at an operational ceiling of 12,000 feet or higher. Operational speeds of UAV 30 may be, for example, between 20 to 80 knots and maximum climb rate may be planned to about 1000 feet per minute. UAV 30 on-board systems may be adapted to provide, continuously or on-demand, data reflecting UAV 30 position, speed, altitude, etc., as well as to monitor and provide data indicative of the operational status of on-board systems of UAV 30. UAV 30 may be equipped with electrical propulsion means. Launching and landing facilities of UAV 30 may support automatic launching mode.

UAV 30 may be provided with automatic recovery functionality. This functionality may provide for quick return of UAV 30 to operation after the end of a session of operation.

Such recovery may be dependent upon various factors such as size of ship, sea and wind conditions, operational conditions and the like. Many modes of recovery may be supported.

Numerous modes of recovery may be used. For example, net recovery may be used, as taught in U.S. Pat. No. 3,980, 259, European Patent Publication No. 1 602 576 A2, US Patent Application Publication No. 2005/0230535, or other suitable modes of recovery.

Figure 2:
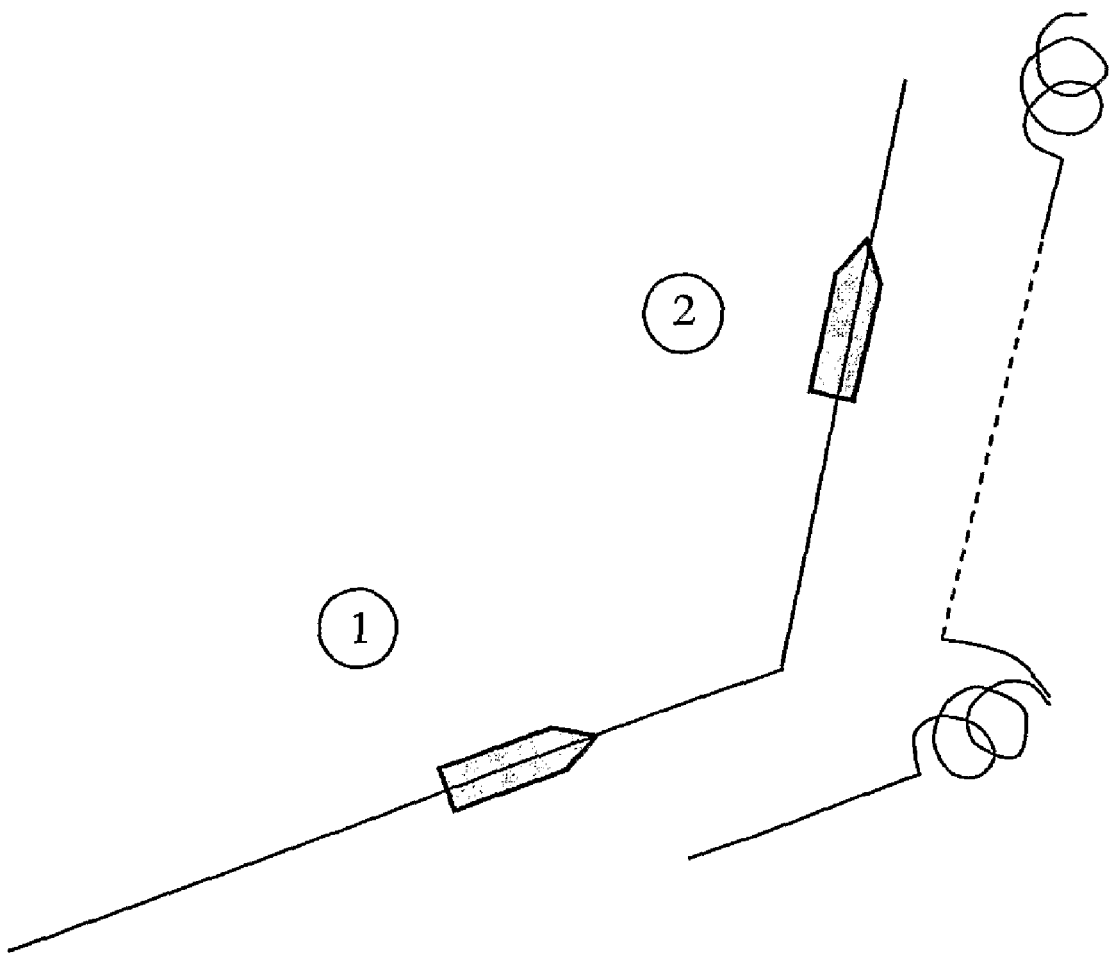
FIG. 2 is a schematic diagram of a movement pattern of a UAV around a ship in accordance with embodiments of the present invention.

The position of a UAV 30 with respect to location of ship 20 may be maintained according one of several modes. Attention is made now to FIG. 2, which is a schematic illustration of fixed location maneuver according to some embodiments of the present invention. UAV 30 may be assigned substantially a fixed position, e.g., distance and direction, with respect to ship 20, which may be maintained by UAV 30 substantially at all times. Thus, during portion 1 of travel of ship 20, UAV 30 may remain at a fixed distance and direction from the ship. UAV 30 may adjust its velocity in response to changing conditions to manage the flight plan. Since UAV 30 may be, under certain circumstances faster than ship 20, its location with respect to ship 20 may be kept constant by maneuvering around the required fix point in tight circles or similar maneuvers so as to keep the required fixed location on the average.

Figure 3:
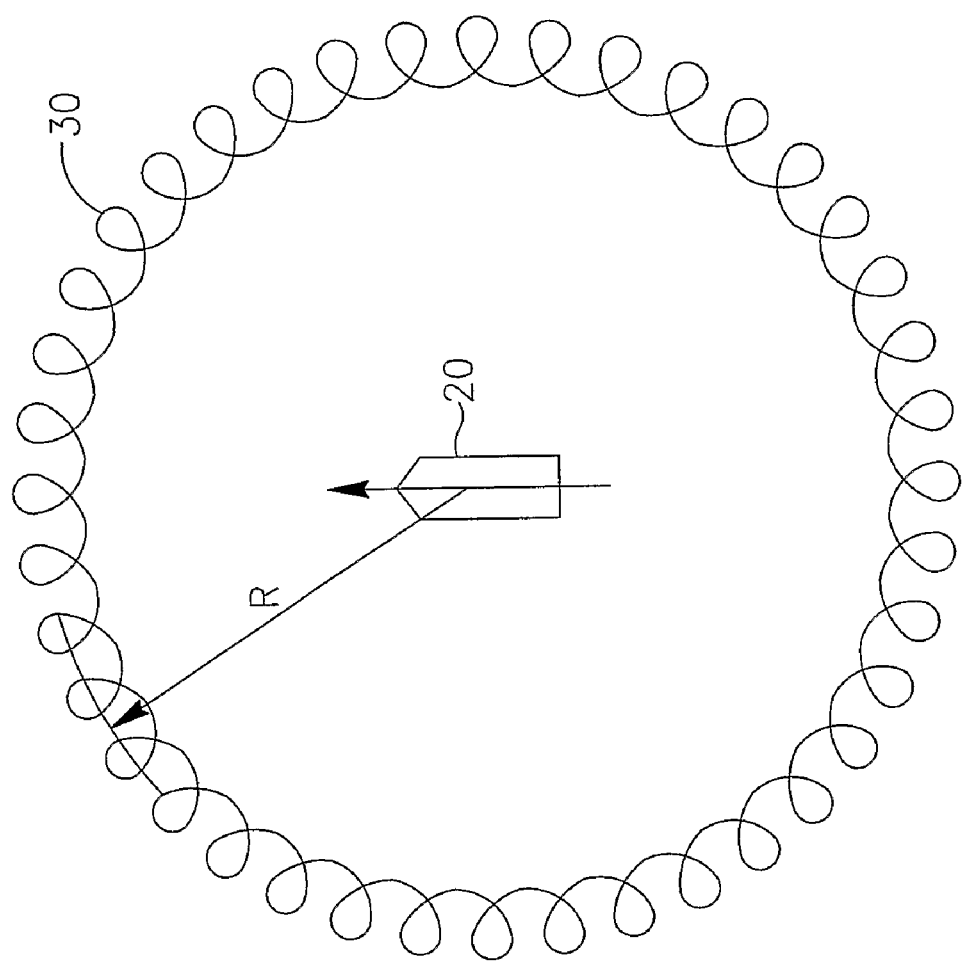
FIG. 3 is a schematic diagram of a movement pattern of a UAV around a ship in accordance with embodiments of the present invention.

Another position mode may be the 'round about' mode. Reference is made to FIG. 3, which is a schematic illustration of a method of maintaining position of a UAV 30 with respect to ship 20 according some embodiments of the present invention. In the mode depicted, each active UAV 30 may circle around ship 20 in a pattern maintaining UAV 30 in a substantially fixed distance R from ship 20 by performing a curved pattern around ship 20 the shape of which depends on the speed and direction of ship 20, as well as possibly on the speed of UAV 30 and its flight conditions. If ship 20 is moving in such a way that, combined with the prevalent wind, UAV 30 can maintain its position relative to the ship when flying along substantially straight lines, then no circling is required. If however, this combined speed is below the minimum operational speed of UAV 30, e.g., when the prevalent wind is a strong tail wind relative to UAV 30, then the position of UAV 30 relative to ship 20 may be maintained by flying along pattern 35, such that the distance from the ship is substantially constant.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method of obtaining information by a maritime vessel comprising the steps of:
    causing an unmanned airborne vehicle to orbit in a controlled pattern with respect to said maritime vessel;
    establishing a communication link between said maritime vessel and said unmanned airborne vehicle;
    receiving electromagnetic transmissions at said unmanned airborne vehicle;
    analyzing at said unmanned airborne vehicle the received transmissions for identifying a property of an emitter of said electromagnetic transmissions; and
    providing to said maritime vessel via said communication link information pertaining to said received electromagnetic transmissions based on the analysis of said received electromagnetic transmissions.

2. The method of claim 1, wherein said property of an emitter comprises at least the nature and location of said emitter.

3. The method of claim 1, comprising providing said information to an electronic warfare (EW) suite associated with said maritime vessel.

4. The method of claim 1, comprising invoking a warning based on said analysis.

5. The method of claim 1, comprising launching said unmanned airborne vehicle.

6. The method of claim 1, comprising landing said unmanned airborne vehicle.

7. The method of claim 1, comprising receiving at said unmanned airborne vehicle commands from a navigation system associated with said maritime vessel.

8. The method of claim 1, further comprising using said unmanned airborne vehicle to maintain a peripheral electronic screen around said maritime vessel.

9. The method of claim 1, wherein providing to said maritime vessel information pertaining to said received electromagnetic transmissions comprises retransmitting to said maritime vessel said received electromagnetic transmissions.

10. The method of claim 9, comprising amplifying and modulating said received electromagnetic transmissions to simulate radar echoes prior to retransmitting said received electromagnetic transmissions.

11. The method of claim 1, wherein said causing an airborne vehicle to orbit in a controlled pattern with respect to said maritime vessel comprises maintaining a substantially fixed position with respect to said maritime vessel.

12. The method of claim 1, wherein said causing an airborne vehicle to orbit in a controlled pattern with respect to said maritime vessel comprises circling about said maritime vessel in a circle having substantially fixed radius.

13. An unmanned airborne vehicle comprising:
    a receiving module, for receiving electromagnetic transmissions;
    a processing module, for analyzing said received electromagnetic transmissions for identifying a property of an emitter of said electromagnetic transmissions; and
    a communication module, for establishing a communication link with a maritime vessel and transmitting to said vessel information pertaining to said received electromagnetic transmissions based on the analysis of said received electromagnetic transmissions.

14. The unmanned airborne vehicle of claim 13 further comprising a payload unit adapted to carry operational warfare measures.

15. The unmanned airborne vehicle of claim 14, wherein said operational warfare measures comprises at least one measure selected from the list of measures consisting of:
    electronic surveillance measures;
    electronic countermeasures; and
    radar warning measures.

16. The unmanned airborne vehicle of claim 14, wherein said payload unit comprises a panoramic reception array of antennas with substantially 360 degrees of azimuth coverage.

17. The unmanned airborne vehicle of claim 16, wherein said array of antennas has coverage of ±30 degrees in elevation.

18. The unmanned airborne vehicle of claim 13, wherein said property of an emitter of said electromagnetic transmission comprises at least the nature and location of said emitter.

19. A system for providing enhanced information to a maritime vessel comprising:
    an unmanned airborne vehicle, comprising:
    a receiving module, for receiving electromagnetic transmissions at said unmanned airborne vehicle;

a processing module, for analyzing said electromagnetic transmissions for identifying a property of an emitter of said electromagnetic transmissions; and a communication module, for establishing a communication link with said maritime vessel and transmitting to said vessel information pertaining to said received electromagnetic transmissions based on the analysis of said received electromagnetic transmissions; and launching and landing modules associated with said maritime vessel for respectively launching and landing said unmanned airborne vehicle.

20. The system of claim 19, wherein said unmanned airborne vehicle further comprises operational warfare measures comprising at least one measure selected from the list consisting of:

electronic surveillance measures;

electronic countermeasures; and radar warning measures.

21. The system of claim 20, further comprising an electronic warfare (EW) suite associated with said maritime vessel for receiving said information pertaining to said received electromagnetic transmissions.

22. The system of claim 19, further comprising a navigation system associated with said maritime vessel for sending commands to said unmanned airborne vehicle.

23. The system of claim 19, further comprising:

a second unmanned airborne vehicle, comprising:

a second receiving module, for receiving electromagnetic transmissions at said second unmanned airborne vehicle;

a second processing module, for analyzing said electromagnetic transmissions at the second unmanned airborne vehicle for identifying a property of an emitter of said electromagnetic transmissions; and a second communication module, for establishing a communication link with said maritime vessel and transmitting to said vessel information pertaining to said received electromagnetic transmissions at said second unmanned airborne vehicle based on the analysis of said received electromagnetic transmissions at said second unmanned airborne vehicle; and launching and landing modules associated with said maritime vessel for respectively launching and landing said second unmanned airborne vehicle.

24. The system of claim 19, wherein said property of an emitter of said electromagnetic transmission comprises at least the nature and location of said emitter.

* * * * *